United States Patent [19]
Hayashi et al.

[11] 3,968,183
[45] July 6, 1976

[54] FILM EXCELLENT IN SLIP CHARACTERISTICS AND ITS PRODUCTION

[75] Inventors: Ikuya Hayashi, Inuyama; Yukio Yamane, Ootsu; Chiyozi Hitomi, Ootsu; Keiske Miyake, Ootsu, all of Japan

[73] Assignee: Toyo Boseki Kabushiki Kaisha, Japan

[22] Filed: June 27, 1974

[21] Appl. No.: 483,707

[30] Foreign Application Priority Data
June 30, 1973 Japan............................... 48-74284
June 30, 1973 Japan............................... 48-74286

[52] U.S. Cl............................. 260/860; 260/40 R
[51] Int. Cl.² ....................................... C08L 67/00
[58] Field of Search............... 260/40 R, 860, 873; 264/216

[56] References Cited
UNITED STATES PATENTS

| | | | |
|---|---|---|---|
| 2,823,421 | 2/1958 | Scarlett | 264/216 |
| 3,223,757 | 12/1965 | Owens et al. | 264/216 X |
| 3,446,778 | 5/1969 | Waller et al. | 260/860 X |
| 3,627,625 | 12/1971 | Jarrett | 260/40 R X |

*Primary Examiner*—Lewis T. Jacobs
*Attorney, Agent, or Firm*—Stewart and Kolasch, Ltd.

[57] ABSTRACT

A polyester block copolymer film excellent in slip characteristics and blocking resistance, which is prepared by melt extruding a polyester block copolymer in a film and cooling the film in a melt state at a temperature of about 40° to 120°C to solidify it, the polyester block copolymer comprising crystalline polyester segments and non-crystalline polymer segments in a weight ratio of 99 : 1 to 10 : 90 and having a number average molecular weight of about 10,000 to 100,000, the melting point of a self-supporting high polymer substantially constituted with the monomer components of the said crystalline polyester segments alone being not lower than about 200°C and the melting point or softening point of a polymer substantially constituted with the said non-crystalline polymer segments themselves being not higher than about 80°C.

19 Claims, No Drawings

FILM EXCELLENT IN SLIP CHARACTERISTICS AND ITS PRODUCTION

The present invention relates to a film excellent in slip characteristics and its production. More particularly, it relates to a polyester block copolymer film, which is improved in slip characteristics without any material deterioration of the advantageous physical and mechanical properties inherent thereto, and its production.

As is well known, polyester block copolymer films are excellent in various physical and mechanical properties such as thermal adhesion, softness, impact strength, heat resistance, transparency and cold resistance. However, the friction coefficient between these films is exceedingly large and the slip between the film and a metal surface is not good, whereby there arise various technical problems during molding of the film and processing thereof such as coating, lamination and bag formation. Further, these films disadvantageously have a large blocking property.

For improving these drawbacks, it is usual to apply a slipping agent on the surface of the film. But, the resulting film is greatly deteriorated in adhesion with a different film or a metal foil on lamination, and the heat seal property of the film itself is also deteriorated. Moreover, when such a film is used for packaging, the slipping agent applied on the surface of the film sticks to the packaged materials. Thus, a film having a slipping agent applied thereto is unsuitable, especially for the packaging of foods.

As the result of a study for overcoming the said disadvantages, it has now been found that, when a polyester block copolymer film which has been melt extruded and is in a melt state is cooled to solidify it at a certain range of temperature, the resulting film is improved in slip characteristics as well as blocking resistance without any material deterioration of the physical and mechanical properties inherent thereto.

According to the present invention, a polyester block copolymer film excellent in slip characteristics and blocking resistance can be prepared by melt extruding a polyester block copolymer in a film and cooling the film in a melt state at a temperature of about 40° to 120°C to solidify it, the polyester block copolymer comprising crystalline polyester segments and non-crystalline polymer segments, the melting point of a self-supporting high polymer substantially constituted with the monomer components of the said crystalline polyester segments alone being not lower than about 200°C and the melting point or softening point of a polymer substantially constituted with the said non-crystalline polymer segments themselves being not higher than about 80°C.

The polyester block copolymer used for the formation of the film of the invention is a block copolymer which comprises crystalline polyester segments, the melting point of a self-supporting high polymer substantially constituted with the monomer components thereof alone being not lower than about 200°C (hereinafter referred to as "crystalline polyester segments"), and non-crystalline polymer segments, the melting point or softening point of a polymer substantially constituted with said non-crystalline polymer segments alone being not higher than about 80°C (hereinafter referred to as "non-crystalline polymer segments"), usually in a weight ratio of 99 : 1 to 10 : 90 (preferably a weight ratio of 90 : 10 to 20 : 80). Said block copolymer usually has a number average molecular weight of about 10,000 to 100,000 (preferably a number average molecular weight of about 30,000 to 70,000) when determined by a terminal group measuring procedure.

The crystalline polyester segments may have usually a number average molecular weight of about 600 to 10,000. Examples thereof are polyesters essentially consisting of aromatic dicarboxylic acid units (e.g. terephthalic acid, isophthalic acid, 1,5-naphthalenedicarboxylic acid, 2,6-naphthalenedicarboxylic acid) and aliphatic, aromatic and/or alicyclic diol units (e.g. ethylene glycol, propylene glycol, tetramethylene glycol, pentamethylene glycol, 2,2-dimethyltrimethylene glycol, hexamethylene glycol, decamethylene glycol, p-xylylene glycol, cyclohexanedimethanol), such polyesters as above but consisting further of hydroxycarboxylic acid units (e.g. p-($\beta$-hydroxyethoxy)benzoic acid, p-hydroxybenzoic acid), polyesters essentially consisting of aromatic ether dicarboxylic acid units (e.g. 1,2-bis(4,4'-dicarboxymethylphenoxy)ethane, di(4-carboxyphenoxy)ethane) and such diol units as mentioned above, polyesters essentially consisting of aromatic amidodicarboxylic acid units (e.g. bis(N-pcarboethoxyphenyl)terephthalimide) and such diol units as mentioned above, etc.

The non-crystalline polymer segments may be those having a number average molecular weight of not less than about 400. Thus, they may have usually a number average molecular weight of about 400 to 8,000, preferably of about 700 to 5,000. Examples thereof are polyethers (e.g. polyethylene glycol, polypropylene glycol, polytetramethylene glycol, ethylene oxide-propylene oxide copolymer, ethylene oxidetetrahydrofuran copolymer), aliphatic polyesters (e.g. polyneopentyl azelate, polyneopentyl adipate, polyneopentyl sebacate), polylactones (e.g. poly-$\epsilon$-caprolactone, polypivalolactone), etc.

The polyester block copolymer can be prepared by a conventional procedure for polycondensation. Preferred examples of such procedures are as follows:

1. Heating a mixture of a dimethyl ester of an aromatic acid, a diol capable of forming the non-crystalline polymer segments and a diol of low molecular weight at a temperature of about 150° to 240°C in the presence of a catalyst for ester exchange polycondensation, removing the methanol produced by the ester exchange and subjecting the obtained prepolymer to vacuum distillation so as to eliminate excess diol of low molecular weight to obtain the polyester block copolymer;

2. Heating a mixture of a polymer capable of forming the crystalline polyester segments and a polymer capable of forming the non-crystalline polymer segments in the presence of a chain extender reactive with the terminal groups of the said polymers and removing volatile components under a highly reduced pressure to obtain the polyester block copolymer;

3. Heating a mixture of a polymer capable of forming the crystalline polyester segments and a lactone so as to effect the ring opening polymerization of the lactone and the ester exchange at the same time to obtain the polyester block copolymer, etc.

As the polyester block copolymer, there may be exemplified polyethylene terephthalate-polyethylene oxide block copolymer, polytetramethylene terephthalate-polyethylene oxide block copolymer, polyethylene terephthalate-polytetramethylene oxide block copolymer, polytetramethylene terephthalate-polytetramethylene oxide block copolymer, polyethylene terephthalate-polyethylene oxide propylene oxide block copolymer, polyethylene terephthalate-poly-ε-caprolactone block copolymer, polytetramethylene terephthalate-poly-ε-caprolactone block copolymer, polyethylene terephthalate-polypivalolactone block copolymer, polyethylene terephthalate-polyethylene adipate block copolymer, polyethylene terephthalate-polyneopentyl sebacate block copolymer, polytetramethylene terephthalate-polyethylene dodecanate block copolymer, polytetramethylene terephthalate-polyneopentyl dodecanate block copolymer, a block copolymer consisting of a polyester of di(4-carboxyphenoxy)ethane with ethylene glycol and polyethylene glycol, a block copolymer consisting of polyester of bis(N-p-carbethoxyphenyl)adipamide with ethylene glycol and polyethylene glycol, etc. For the preparation of packaging film, there is most advantageously employed polytetramethylene terephthate-polytetramethylene oxide (90 : 10 – 40 : 60 by weight) block copolymer.

For preparation of a film, the polyester block copolymer is melt extruded by the use of a conventional extruder, for instance, through a T die. Prior to such melt extruding, it may be desirable to make the water content of the polyester block copolymer 0.2 % by weight or less. Otherwise, the polyester block copolymer will be hydrolyzed to make the surface of the resulting film uneven, colored and foamy. The temperature for melting may be usually from about 160° to 280°C.

The extruded film in a melt state is then cooled at a temperature of from about 40° to 120°C to solidify it. When cooling to solidification is effected at a temperature of about 0° to 40°C, the slip characteristics of the resulting film are inferior so that many wrinkles are formed on taking up the film and blocking is often produced. In order to effect cooling at the said range of temperature, any cooling means (e.g. cooling roll, cooling bath) may be used. When a cooling roll is used, the surface is not particularly limited and may be a planished or roughened one. In order to enhance the slip characteristics, however, the use of a cooling roll having a roughened surface is favorable. The film distance between the die of the extruder and the position at which the cooling under the said condition starts is preferred to be as short as possible for avoiding the production of necking-in in the extruded film, and it may be normally from about 10 to 100 mm. The thickness of the film may be appropriately decided depending on the use and, from the practical viewpoint, may be usually from about 30 to 500 $\mu$, preferably from about 30 to 100 $\mu$. The cooled and solidified film is then taken up in a conventional manner without producing any wrinkles.

The thus obtained film is excellent in slip characteristics. This is probably due to the crystallization which occurs partially at the surface by cooling under the said specific conditions. While conventional thermoplastic films are lowered in the heat seal property when any crystallization occurs, the film of this invention maintains a sufficient heat seal property.

In order to make the slip characteristics of the film more improved, any inorganic material in fine particles may be incorporated into the polyester block copolymer. Examples of the inorganic material are oxides and salts of the metals belonging to Groups II, III and IV of the Periodic Table (short period). More specifically, there may be exemplified MgO, $MgCO_3$, $MgSO_4$, $CaCO_3$, $CaSO_4$, $BaSO_4$, $Al_2O_3$, $SiO_2$, $TiO_2$, talc, clay, etc. The particle size of the inorganic material may be usually from about 0.1 to 10 $\mu$ on the average. When the particle size is smaller, it is not sufficiently effective in enhancing the slip characteristics. When larger, the transparency and haze of the film are deteriorated and a great amount of glittering is produced. Thus, the appearance is made unfavorable. The amount of the inorganic material to be incorporated may be usually in a range of about 0.01 to 5 % by weight based on the weight of the polyester block copolymer. A smaller amount is not effective in enhancement of the slip characteristics, while a larger amount deteriorates the transparency, thermal adhesion and adhesion with any other film.

The incorporation of the inorganic material may be effected, for instance, by adding the same to any of the starting materials prior to the polymerization, adding the same to a mixture of the starting materials during polymerization, admixing the same into the polyester block copolymer prior to the melt extrusion, or the like.

Besides, any other additives such as stabilizers, ultraviolet ray absorbers, antistatic agents, pigments and thermoplastic resins may be also incorporated into the polyester block copolymer, when desired.

The film of this invention possesses the following physical constants:

| | |
|---|---|
| Specific gravity | 1.003–1.300 |
| Young's modulus (kg/cm$^2$) | 1,500 or less (preferably 300 to 1000) (at 20°C) |
| Breaking strength (kg/cm$^2$) | 150–800 (at 20°C) |
| Breaking elongation (%) | 300 or more (preferably 300 to 1200) (at 20°C) |
| Impact strength (kg.cm/25 $\mu$) | 8 or more (preferably 8 to 15) (at 20°C) |
| Thermal adhesion (kg/cm) | 0.5 or more (preferably 0.5 to 3.0) (at 20°C) |
| Oxygen permeability constant (cc.cm/cm$^2$.sec.cmHg) | $0.5 \times 10^{-10}$ – $100 \times 10^{-10}$ (at 30°C) |
| Clarity (%) | 80 or more |
| Haze (%) | 2 or less |

Further, the blocking strength of the film is not more than 1.3 g/cm, usually from about 0.8 to 1.3 g/cm, when said inorganic material is not incorporated therein. It is not more than about 0.5 g/cm, when the inorganic material is incorporated within the said range. Furthermore, in case of the inorganic material being incorporated in the film, the film shows a static friction coefficient of about 0.4 to 1.0 and a kinetic friction coefficient of about 0.5 to 2.0.

The film of this invention is exceedingly soft and superior in impact strength, cold resistance, heat resistance and thermal adhesion. Its good slip characteristics are particularly notable. Due to such advantageous properties, the film may be employed as such or as a laminated product for various uses. When the film is laminated with a different film or a metal foil, a high adhesion between the laminated layers can be assured because of the absence of any slip agent. In addition, the film exhibits an excellent heat seal property when heat sealed with another film of the same or a different kind. Moreover, it is quite suitable for packaging foods since any slip agent is not applied to the surface. Practical and presently preferred embodiments of the invention are illustratively shown in the following Examples wherein parts are by weight. The determination of the properties is effected according to the following procedures:

1. Melting point: The specimen is heated in a micromelting point-measuring apparatus (manufactured by Yanagimoto Seisakusho K.K.) while elevating the temperature at a rate of 1°C/min. The observation is made by a polarizing microscope, and the temperature at which the field of view becomes dark is taken as the melting point.

2. Softening point: The specimen is heated in the apparatus as above while elevating the temperature at a rate of 1°C/min. The observation is made by a microscope, and the temperature at which the softening and deforming start is noted.

3. Reduced viscosity: The determination is made at 30°C on a 0.2 % phenol-tetrachloroethane (6 : 4) solution.

4. Breaking strength and breaking elongation: The determination is carried out at a temperature of 20°C under a relative humidity of 65 % by a tensile testing machine ("Tensilon UTM-III" manufactured by Toyo Seiki K.K.) at a crosshead speed of 500 mm/min.

5. Impact strength: The determination is made at a temperature of 20°C under a relative humidity of 65 % by a film impact tester (manufactured by Toyo Seiki K.K.).

6. Clarity and haze: By a light transmission measuring apparatus of integrating sphere type, the amount of incident rays ($T_1$), the total amount of transmitted rays ($T_2$), the amount of rays scattered by the apparatus ($T_3$) and the amount of rays scattered by the apparatus and the specimen ($T_4$) are determined, and on the basis of these values, calculation is effected according to the following equations:

$$\text{Clarity } (T_t) = \frac{T_2}{T_1} \times 100 \, (\%)$$

$$\text{Transmission of scattering rays } (T_d) = \frac{T_4 - T_3(T_2/T_1)}{T_1} \times 100 \, (\%)$$

$$\text{Haze} = \frac{T_d}{T_t} \times 100 \, (\%)$$

7. Gas transmission: The determination is made at 30°C by a duplex gas transmission measuring apparatus (manufactured by Rika Seiki Kogyo K.K.) according to ASTM (American Society for Testing and Materials) D-1434-58.

8. Specific gravity: The determination is made according to JIS (Japanese Industrial Standard) K-6911.

9. Thermal adhesion: The specimen is subjected to thermal adhesion at 250°C for 1 second under a pressure of 2.0 kg/cm² by a heat sealer and, after allowing it to stand for 24 hours, the heat seal strength is determined by the "Tensilon".

10. Blocking strength: The determination is made according to ASTM D-1893 in the following manner. Two film specimens (8 cm × 12 cm) are piled on each other and placed between two glass plates, and a load of 2.0 kg is applied thereto. After allowing the resulting sample to stand at a temperature of 40°C under a relative humidity of 65 % for 24 hours, the films are separated from each other by a rod of 6.3 mm in diameter at a rate of 100 mm/min, and the strength required for the complete separation is determined by the Tensilon. Measurement is repeated three times, and the average value represented as a strength per unit width is taken as the blocking strength.

11. Friction coefficient: The determination is made according to ASTM D-1894-63 but, since the film specimen is soft, the weight of the thread is 38 g/6.3 cm × 6.3 cm. Under a rate of 20 cm/min., the friction coefficient between the chill faces of the two films is measured.

EXAMPLE 1

In a stainless steel made reaction vessel, there are charged dimethyl terephthalate (10,000 parts), 1,4-butanediol (5,800 parts) and titanium tetrabutoxide (6 parts), and the contents are heated at 140° to 230°C in a nitrogen atmosphere to complete the ester exchange reaction. The reaction mixture is added to a mixture of polytetramethylene oxide (molecular weight, 1,000; 3,800 parts) and an antioxidant ("Irganox 1010" manufactured by Geigy) (30 parts) previously heated at 230°C. The resulting mixture is stirred while elevating the temperature up to 245°C and gradually reducing the pressure to about 0.1 mmHg, and the polycondensation is effected for 2 hours under these conditions. The produced polymer is cooled with water, pelletized into a cylindrical form of 3 mm in diameter and 3 mm in length and dried at 80°C under a pressure of about 0.1 mmHg for 5 hours to give polytetramethylene terephthalate-polytetramethylene oxide block copolymer (hereinafter referred to as "polyester block copolymer (I)"). Reduced viscosity, 1.74 dl/g. Melting point, 215°C.

The polyester block copolymer (I) is, after being dried well under reduced pressure so as to obtain a water content of 0.005 % by weight, subjected to the production of a film by an extruder in which the diameter of the screw is 40 mm $\phi$, the width of the T die is 500 mm and the lip is 0.7 mm under the following conditions: temperature of barrel, 240°C; temperature of adapter, 245°C; temperature of T die, 250°C; rotation of screw, 42 rpm; film distance between T die and cooling roll, 40 mm; temperature of cooling roll, 70°C; take-up rate, 1.9 m/min. As the cooling roll, the one whose surface is plated with chromium is used. For effecting the cooling of the film uniformly, an air-knife is used on the cooling roll. The take-up of the film is satisfactorily effected without formation of wrinkles. The properties of the film are shown in Table 1.

EXAMPLE 2

Using the polyester block copolymer (I), the production of a film is carried out in the same manner as in Example 1 but changing the temperature of the cooling roll to 40°C. The take-up of the film is effected satisfactorily. The properties of the film are shown in Table 1.

REFERENCE EXAMPLE 1

Using the polyester block copolymer (I), the production of a film is carried out in the same manner as in Example 1 but changing the temperature of the cooling roll to 19.5°C. The obtained film is excellent in clarity, but the slip between the film and a metal roll and the slip between the films are insufficient so that wrinkles are formed on taking up the film and a uniform take-up is thus difficult. The properties of the film are shown in Table 1. Apparently, the slip characteristics and the blocking resistance are inferior, although the other properties are excellent.

Table 1

|  | Example 1 | Example 2 | Reference Example 1 |
| --- | --- | --- | --- |
| Thickness ($\mu$) | 54.7 | 55.9 | 60.3 |
| Clarity (%) | 81.7 | 86.4 | 90.5 |
| Take-up characteristics | Good | Good | Bad |
| Blocking strength (g/cm) | 0.86 | 1.02 | 2.54 |
| Specific gravity | 1.229 | 1.228 | 1.228 |
| Breaking strength (kg/cm$^2$) | 620 | 590 | 580 |
| Breaking elongation (%) | 470 | 500 | 520 |
| Impact strength (kg.cm/25 $\mu$) | 16.6 | 17.1 | 16.8 |
| Oxygen permeability constant (cc.cm/cm$^2$.sec.cmHg) | $1.0 \times 10^{-10}$ | $1.0 \times 10^{-10}$ | $1.1 \times 10^{-10}$ |
| Water vapor transmission (g/m$^2$.24 hr) (calculated as 25 $\mu$) | 340 | 355 | 368 |

Table 2

|  | Example 3 | Reference Example 2 |
| --- | --- | --- |
| Thickness ($\mu$) | 54.3 | 59.5 |
| Clarity (%) | 81.2 | 90.1 |
| Take-up characteristics | Good | Bad |
| Blocking strength (g/cm) | 1.26 | 4.50 |
| Specific gravity | 1.176 | 1.174 |
| Breaking strength (kg/cm$^2$) | 550 | 530 |
| Breaking elongation (%) | 590 | 630 |
| Impact strength (kg.cm/25 $\mu$) | NB | NB |
| Oxygen permeability constant (cc.cm/cm$^2$.sec.cmHg) | $4.4 \times 10^{-10}$ | $4.7 \times 10^{-10}$ |
| Water vapor transmission (g/m$^2$.24 hr) (calculated as 25 $\mu$) | 665 | 680 |

EXAMPLE 3

In a stainless steel made reaction vessel, there are charged dimethyl terephthalate (6200 parts), 1,4-butanediol (4000 parts) and titanium tetrabutoxide (5.5 parts), and the contents are heated at 140° to 230°C in a nitrogen atmosphere to complete the ester exchange reaction. The reaction mixture is added to a mixture of polytetramethylene oxide (molecular weight, 1000; 5000 parts) and an antioxidant ("Sumilizer BHT" manufactured by Sumitomo Chemical Company, Limited) (23 parts) previously heated at 230°C. The resulting mixture is stirred while elevating the temperature up to 245°C and gradually reducing the pressure to about 0.1 mmHg, and the polycondensation is effected for 2 hours under these conditions. The produced polymer is dried at 80°C under a pressure of about 0.1 mmHg for 5 hours to give polytetramethylene terephthalate-polytetramethylene oxide block copolymer (hereinafter referred to as "polyester block copolymer (II)"). Reduced viscosity, 1.99 dl/g. Melting point, 205°C.

The polyester block copolymer (II) is, after being dried well under a reduced pressure to obtain a water content of 0.005 % by weight, subjected to the production of a film by the use of the same extruder as in Example 1 under the following conditions: temperature of barrel, 240°C; temperature of adopter, 245°C; temperature of T die, 250°C; rotation of screw, 42 rpm, film distance between T die and cooling roll, 40 mm; temperature of cooling roll, 80°C; take-up rate, 1.9 m/min. The slip between the film and a metal roll between the slip and the films are good, and the take-up of the film is effected satisfactorily. The properties of the film are shown in Table 2.

REFERENCE EXAMPLE 2

Using the polyester block copolymer (II), the production of a film is effected in the same manner as in Example 3 but changing the temperature of the cooling roll to 19.5°C. The obtained film is excellent in clarity but the slip characteristics are inferior so that wrinkles are formed on taking up the film and a uniform take-up is difficult. The properties of the film are shown in Table 2. Apparently, the slip characteristics and the blocking resistance are inferior, although the other properties are excellent.

EXAMPLE 4

On a biaxially stretched film of polyethylene terephthalate (thickness, 19 $\mu$), there is applied a 15 % by weight (as the solid content) solution of a 95 : 5 by weight (as the solid content) mixture of a polyester copolymer adhesive ("Vylon 300" manufactured by Toyo Boseki K.K.) and an isocyanate adhesive ("Collonate L" manufactured by Nippon Polyurethane K.K.) in ethyl acetate by a gravure roll (100 mesh × 40 $\mu$), and the film is passed through a drier of 4 m in length at a rate of 30 m/min. On the dried film, the unstretched polyester block copolymer film as obtained in Example 1 or 3 is laminated under dry conditions at a nip temperature of 90° to 95°C under a nip pressure of 5 kg/cm$^2$. The surface of the unstretched polyester block copolymer film layer of the thus obtained film is heat sealed with that of the other thus obtained film. The heat seal strength is shown in Table 3.

Table 3

| Composition of film | Heat seal strength (g/cm) | | |
| --- | --- | --- | --- |
|  | 20°C | 150°C | 160°C |
| Polyethyleneterephthalate (19$\mu$)/ polyester block copolymer (I) (54.7$\mu$) | 4000 | — | 500 |
| Polyethyleneterephthalate (19$\mu$)/ polyester block copolymer (II)(54.3$\mu$) | 3000 | 500 | — |

When these laminated films are treated with boiling water at 130°C for 30 minutes in an autoclave, the separation of the laminated layers is not observed.

EXAMPLE 5

The ester exchange reaction and the polycondensation are effected in same manner as in Example 1 but incorporating fine particles of silica ("Syloid 266" manufactured by Fuji Devison Co., Ltd.; average particle size, 1.5 $\mu$) (75 parts) into the starting materials to obtain polytetramethylene terephthalate-polytetramethylene oxide block copolymer containing 0.5 % by weight of fine particles of silica (hereinafter referred to as "polyester block copolymer (III)").

The polyester block copolymer (III) is admixed with the polyester block copolymer (I) so as to make a designed silica content. The resultant mixture is, after being dried well under reduced pressure to obtain a water content of 0.005 % by weight, subjected to the production of a film by an extruder in which the diameter of the screw is 20 mm φ, the width of the T die is 120 mm and the lip is 0.5 mm under the following conditions: temperature of barrel, 250°C; temperature of adapter, 250°C; temperature of T die, 250°C; rotation of screw, 36 rpm; film distance between T die and cooling roll, 40 mm; temperature of cooling roll, 60°C; take-up rate, 1.7 m/min. The thickness, clarity, haze and friction coefficient of the film are shown in Table 4. It is apparent that the incorporation of fine particles of silica can afford a film excellent in slip characteristics while maintaining a good transparency.

REFERENCE EXAMPLE 3

The polyester block copolymers (I) and (III) are mixed together to obtain a mixture having a silica content of 0.02 % by weight or 0.05 % by weight. After drying, the mixture is subjected to the production of a film under the same conditions as in Example 5 but changing the temperature of the cooling roll to 19.2°C. The properties of the film are shown in Table 4. It is apparent that the film is excellent in clarity but inferior in slip characteristics, compared with the corresponding film obtained in Example 5.

Table 4

| Example No. | Silica content (% by weight) | Thickness (μ) | Clarity (%) | Haze (%) | Static friction coefficient | Kinetic friction coefficient | Blocking strength (g/cm) |
| --- | --- | --- | --- | --- | --- | --- | --- |
| 5 | 0.02 | 55 | 88.4 | 2.3 | 1.73 | 0.98 | 0.52 |
| 5 | 0.05 | 55 | 85.4 | 5.1 | 1.16 | 0.58 | 0.33 |
| 5 | 0.10 | 49 | 89.0 | 3.0 | 0.49 | 0.40 | 0.20 |
| 5 | 0.25 | 56 | 86.0 | 9.1 | 0.49 | 0.44 | 0.10 |
| 5 | 0.5 | 62 | 87.7 | 8.2 | 0.45 | 0.42 | 0 |
| Reference Example 3 | 0.02 | 60 | 89.9 | 0.7 | Stick slip | Stick slip | 0.90 |
| Reference Example 3 | 0.05 | 61 | 90.1 | 1.6 | 1.65 | 0.92 | 0.82 |

EXAMPLE 6

The ester exchange reaction and the polycondensation are effected as in Example 3 but incorporating fine particles of silica ("Syloid 266" manufactured by Fuji Devison Co., Ltd.; average particle size, 1.5 μ) (57.5 parts) into the starting materials to obtain polytetramethylene terephthalate-polytetramethylene oxide block copolymer containing 0.5 % by weight of fine particles of silica (hereinafter referred to as "polyester block copolymer (IV)").

The polyester block copolymer (IV) is admixed with the polyester block copolymer (II) so as to make a designed silica content. The mixture is, after being dried well under reduced pressure, subjected to the production of a film by the use of the same extruder as in Example 5 under the following conditions: temperature of barrel, 250°C; temperature of adapter, 250°C; temperature of T die, 250°C; rotation of screw, 36 rpm; film distance between T die and cooling roll, 40 mm; temperature of cooling roll, 60°C; take-up rate, 1.7 m/min. The properties of the film are shown in Table 5. It is apparent that the incorporation of fine particles of silica can afford a film excellent in slip characteristics while maintaining a good clarity.

REFERENCE EXAMPLE 4

The polyester block copolymers (II) and (IV) are mixed together to obtain a mixture having a silica content of 0.02 % by weight or 0.05 % by weight. After drying, the mixture is subjected to the production of a film under the same conditions as in Example 6 but changing the temperature of cooling roll to 19.2°C. The properties of the film are shown in Table 5. It is apparent that the film is excellent in clarity but inferior in slip characteristics, compared with the corresponding film obtained in Example 6.

Table 5

| Example No. | Silica content (% by weight) | Thickness (μ) | Clarity (%) | Haze (%) | Static friction coefficient | Kinetic friction coefficient | Blocking strength (g/cm) |
| --- | --- | --- | --- | --- | --- | --- | --- |
| 6 | 0.02 | 59 | 88.7 | 1.8 | 1.95 | 1.02 | 0.48 |
| 6 | 0.05 | 54 | 88.3 | 2.7 | 1.03 | 0.66 | 0.35 |
| 6 | 0.10 | 57 | 88.5 | 4.9 | 0.55 | 0.49 | 0.22 |
| 6 | 0.25 | 55 | 88.0 | 8.8 | 0.47 | 0.45 | 0.11 |
| 6 | 0.5 | 62 | 87.2 | 9.3 | 0.47 | 0.43 | 0 |
| Reference Example 4 | 0.02 | 71 | 90.0 | 0.8 | Stick slip | Stick slip | 0.87 |
| Reference Example 4 | 0.05 | 57 | 90.3 | 1.5 | 1.52 | 0.97 | 0.80 |

EXAMPLE 7

The polyester block copolymer (I) is admixed with fine particles of inorganic materials as shown in Table 6 while stirring, and the resultant mixture is pelletized, dried and subjected to the production of a film under the same conditions as in Example 1 to obtain a film having a thickness of about 55 to 60 μ. The properties of the film are shown in Table 6.

Table 6

| Inorganic material | Average particle size (μ) | Trade name | Manufacturer | Amount (% by weight) | Clarity (%) | Static friction coefficient | Kinetic friction coefficient | Blocking strength (g/cm) | Remark |
| --- | --- | --- | --- | --- | --- | --- | --- | --- | --- |
| Silica | 0.016 | Aerosil 200 | Nippon Aerosil K.K. | 0.5 | 83.6 | Stick slip | Stick slip | 0.92 | Control |
| Calcium carbonate | 0.04 | Carlstar RB | Konoshima Kagaku Kogyo K.K. | 0.5 | 83.4 | Stick slip | Stick slip | 0.85 | Control |
| Calcium carbonate | 0.48 | Sunlight No. 1500 | Takehara Kagaku Kogyo K.K. | 0.25 | 86.5 | 0.79 | 0.63 | 0.25 | |
| Silica | 1.5 | Syloid 266 | Fuji Devison Co., Ltd. | 0.10 | 87.9 | 0.50 | 0.42 | 0.22 | |

Table 6-continued

| Inorganic material | Average particle size (μ) | Trade name | Manufacturer | Amount (% by weight) | Clarity (%) | Static friction coefficient | Kinetic friction coefficient | Blocking strength (g/cm) | Remark |
|---|---|---|---|---|---|---|---|---|---|
| Magnesium silicate | 2.4 | 3S Talc | Maruo Calcium Co., Ltd. | 0.10 | 87.3 | 0.48 | 0.43 | 0.24 | |
| Silica | 4.0 | Syloid 978 | Fuji Devison Fo., Ltd. | 0.10 | 86.2 | 0.45 | 0.40 | 0.15 | |
| Silica | 10 | Syloid 161 | Fuji Devison Co., Ltd. | 0.10 | 84.0 | 0.44 | 0.42 | 0.16 | |

It is apparent that the incorporation of fine particles having an average particle size smaller than 0.1 μ does not afford any appreciable improving effect on slip characteristics even with an amount of 0.5 % by weight. It is also apparent that the incorporation of fine particles having an average particle size larger than 10 μ can afford an excellent improving effect on the slip characteristics but greatly lowers the clarity.

EXAMPLE 8

On a biaxially stretched film of polyethylene terephthalate (thickness, 19 μ), there is applied a 15 % by weight (as the solid content) solution of a 95 : 5 by weight (as the solid content) mixture of a polyester copolymer adhesive ("Vylon 300"manufactured by Toyo Boseki K.K.) and an isocyanate adhesive ("Collonate L" manufactured by Nippon Polyurethane K.K.) in ethyl acetate by a gravure roll (100 mesh × 40 μ), and the film is passed through a drier of 4 m in length at a rate of 30 m/min. On the dried film, the film obtained as in Example 5 or 6 is laminated under dry conditions at a nip temperature of 90° to 95°C under a nip pressure of 5 kg/cm². The peeling off property between the laminated layers of the thus obtained film and the heat seal strength between the surfaces of the polyester block copolymer film layers are shown in Table 7.

Table 7

| Composition of film | Silica content (% by weight) | Heat seal strength (kg/cm |
|---|---|---|
| Polyethyleneterephthalate (19μ)/ polyester block copolymer in Example 5 (55μ) | 0.02 | 3.9 |
| Polyethyleneterephthalate (19μ)/ polyester block copolymer in Example 5 (55μ) | 0.05 | 4.0 |
| Polyethyleneterephthalate (19μ)/ polyester block copolymer in Example 5 (49μ) | 0.10 | 3.8 |
| Polyethyleneterephthalate (19μ)/ polyester block copolymer in Example 5 (56μ) | 0.25 | 3.8 |
| Polyethyleneterephthalate (19μ)/ polyester block copolymer in Example 5 (62μ) | 0.50 | 3.6 |
| Polyethyleneterephthalate (19μ)/ polyester block copolymer in Example 6 (59μ) | 0.02 | 3.0 |
| Polyethyleneterephthalate (19μ)/ polyester block copolymer in Example 6 (54μ) | 0.05 | 3.0 |
| Polyethyleneterephthalate (19μ)/ polyester block copolymer in Example 6 (57μ) | 0.10 | 2.9 |
| Polyethyleneterephthalate (19μ)/ polyester block copolymer in Example 6 (55μ) | 0.25 | 2.8 |
| Polyethyleneterephthalate (19μ)/ polyester block copolymer in Example 6 (62μ) | 0.50 | 2.7 |

What is claimed is:

1. A film of a polyester block copolymer, which has the following physical constants:

| | | |
|---|---|---|
| (1) | Specific gravity | 1.003–1.300 |
| (2) | Young's modulus (kg/cm²) | not more than 1,500 (at 20°C) |
| (3) | Breaking strength (kg/cm²) | 150–800 (at 20°C) |
| (4) | Breaking elongation (%) | not less than 300 (at 20°C) |
| (5) | Impact strength (kg.cm/25μ) | not less than 8 (at 20°C |
| (6) | Thermal adhesion (kg/cm) | not less than 0.5 (at 20°C) |
| (7) | Oxygen permeability constant (cc.cm/cm².sec.cmHg) | $0.5 \times 10^{-10}$ –100 $\times 10^{-10}$ (at 30°C) |
| (8) | Clarity (%) | not less than 80 |
| (9) | Haze (%) | not more than 2, | the polyester block copolymer comprising crystalline polyester segments and non-crystalline polymer segments in a weight ratio of 99 : 1 to 10 : 90 and having a number average molecular weight of about 10,000 to 100,000, the melting point of a high self-supporting polymer substantially constituted with the monomer components of the said crystalline polyester segments alone being not lower than about 200°C and the melting point or softening point of a polymer substantially constituted with the said non-crystalline polymer segments themselves being not higher than about 80°C, said film being prepared by melt extruding said polyester block copolymer to form a film and cooling the film in a melt state at a temperature of about 40° to 120°C to solidify it.

2. The film according to claim 1, which has a blocking strength of not more than about 1.3 g/cm.

3. The film according to claim 1, wherein the polyester block copolymer is incorporated with at least one inorganic material in fine particles in an amount of about 0.01 to 5 % by weight based on the weight of the polyester block copolymer.

4. The film according to claim 3, wherein the inorganic material is present in the form of fine particles having a particle size of about 0.1 to 10 μ on the average.

5. The film according to claim 4, wherein the inorganic material is a member selected from the group consisting of oxides and salts of the metals belonging to Groups II, III and IV of the periodic table.

6. The film according to claim 3, which has a blocking strength of not more than about 0.5 g/cm.

7. The film according to claim 6, which has a static friction coefficient of about 0.4 to 1.0 and a kinetic friction coefficient of about 0.5 to 2.0.

8. The film according to claim 1, wherein the crystalline polyester segments comprise terephthalic acid or a mixture thereof with isophthalic acid as the dicarboxylic acid component and ethylene glycol or tetramethylene glycol as the glycol component and the non-crystalline polymer segments comprise polyethylene glycol or polytetramethylene glycol.

9. The film according to claim 1, wherein the polyester block copolymer is a polytetramethylene terephthalate-polytetramethylene oxide block copolymer having a weight ratio of 90 : 10 to 40 : 60.

10. A process for preparing a polyester block copolymer film excellent in slip characteristics and blocking resistance, which comprises melt extruding a polyester block copolymer to form a film and cooling the film in a melt state at a temperature of about 40° to 120°C to solidify it, the polyester block copolymer comprising crystalline polyester segments and non-crystalline polymer segments in a weight ratio of 99 : 1 to 10 : 90 and having a number average molecular weight of about 10,000 to 100,000, the melting point of a high self-supporting polymer substantially constituted with the monomer components of the said crystalline polyester segments alone being not lower than about 200°C and the melting point or softening point of a polymer substantially constituted with the said non-crystalline polymer segments themselves being not higher than about 80°C.

11. The process according to claim 10, wherein the weight ratio of the crystalline polyester segments and the non-crystalline polymer segments is from 90 : 10 to 20 : 80.

12. The process according to claim 10, wherein the non-crystalline polymer segments are those having a molecular weight of about 400 to 8,000 when a polymer is produced with them alone.

13. The process according to claim 10, wherein the crystalline polyester segments are constituted with terephthalic acid or its mixture with isophthalic acid as the dicarboxylic acid component and ethylene glycol or tetramethylene glycol as the glycol component and the non-crystalline polymer segments are constituted with polyethylene glycol or polytetramethylene glycol.

14. The process according to claim 10, wherein the polyester block copolymer is a polytetramethylene terephthalate-polytetramethylene oxide block copolymer having a weight ratio of 90 : 10 to 40 : 60.

15. The process according to claim 10, wherein said polyester block copolymer having a water content of not more than 0.2 % by weight is melt extruded at a temperature of about 160° to 280°C in an extruder.

16. The process according to claim 15, wherein the extruded film in a melt state is cooled at a temperature of about 40' to 120°C. with a cooling roll to solidify it.

17. The process according to claim 10, wherein the polyester block copolymer is incorporated with at least one inorganic material in fine particles in an amount of about 0.01 to 5 % by weight based on the weight of the polyester block copolymer.

18. The process according to claim 17, wherein the inorganic material is present in the form of fine particles having a particle size of about 0.1 to 10$\mu$ on the average.

19. The process according to claim 18, wherein the inorganic material is a member selected from the group consisting of oxides and salts of the metals belonging to Groups II, III and IV of the periodic table.

* * * * *